US012638745B2

(12) United States Patent
Cushing et al.

(10) Patent No.: US 12,638,745 B2
(45) Date of Patent: May 26, 2026

(54) ENTANGLED PHOTON SOURCE THAT CAN REPLACE A PULSED LASER IN NON-ABLATIVE MULTIPHOTON AND NONLINEAR PROCESSES

(71) Applicant: California Institute of Technology, Pasadena, CA (US)

(72) Inventors: Scott K. Cushing, Glendale, CA (US); Szilard Szoke, Pasadena, CA (US); Manni He, Pasadena, CA (US); Bryce P. Hickam, Pasadena, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 452 days.

(21) Appl. No.: 17/876,915

(22) Filed: Jul. 29, 2022

(65) Prior Publication Data

US 2022/0382125 A1 Dec. 1, 2022

Related U.S. Application Data

(63) Continuation of application No. 17/110,599, filed on Dec. 3, 2020, now Pat. No. 11,448,938.
(Continued)

(51) Int. Cl.
*G02F 1/39* (2006.01)
*G01J 3/42* (2006.01)
(Continued)

(52) U.S. Cl.
CPC .................. *G02F 1/39* (2013.01); *G01J 3/42* (2013.01); *G01N 21/31* (2013.01); *G01N 21/6458* (2013.01)

(58) Field of Classification Search
CPC . G02F 1/39; G02F 1/3558; G01J 3/42; G01N 21/31
See application file for complete search history.

(56) References Cited

U.S. PATENT DOCUMENTS 5,796,477 A * 8/1998 Teich ................. G01N 21/6458 356/450
6,714,569 B2 3/2004 Zhu et al.
(Continued)

FOREIGN PATENT DOCUMENTS

JP 2014175488 A 9/2014

OTHER PUBLICATIONS

Schlawin, F., Dorfman, K.E. and Mukamel, S., 2018. Entangled two-photon absorption spectroscopy. Accounts of chemical research, 51(9), pp. 2207-2214. (Year: 2018).*
(Continued)

*Primary Examiner* — Michelle M Iacoletti
*Assistant Examiner* — Mohamed Doumbia
(74) *Attorney, Agent, or Firm* — GATES & COOPER LLP

(57) ABSTRACT

A coherent, entangled photon source which uses a continuous wave laser to replace pulsed photon excitation sources in multiphoton nonlinear processes. In various embodiments, the device comprises a continuous wave photon laser creating electromagnetic radiation at a specific frequency and narrow linewidth. The emitted beam may be conditioned by an optical fiber to allow for efficient interaction with a nonlinear crystal. The nonlinear material is designed and fabricated in a specific manner, enabling the quantum mechanical process of a single photon with well-defined energy being converted into two or more photons which display quantum correlations. The nonlinear material and subsequent fiber-optic or free space components control the temporal, spatial, and polarization-related quantum correlations such that the entangled photons can create a signal in multi photon nonlinear processes that is the same or exceeds that of a pulsed photon source but at the average and peak powers of a continuous wave laser.

23 Claims, 9 Drawing Sheets

Related U.S. Application Data

(60) Provisional application No. 62/942,806, filed on Dec. 3, 2019.

(51) Int. Cl.
*G01N 21/31* (2006.01)
*G01N 21/64* (2006.01)

(56) References Cited

U.S. PATENT DOCUMENTS

| | | | |
|---|---|---|---|
| 7,408,637 B2 * | 8/2008 | Freeling | G01J 3/021 356/300 |
| 7,489,436 B1 * | 2/2009 | Fiorentino | G02F 1/39 359/332 |
| 8,173,982 B2 | 5/2012 | Edamatsu et al. | |
| 8,488,231 B2 | 7/2013 | Shimizu et al. | |
| 9,389,063 B2 | 7/2016 | Wong et al. | |
| 2002/0154663 A1 | 10/2002 | Zhu et al. | |
| 2011/0255150 A1 | 10/2011 | Nguyen | |
| 2011/0315901 A1 | 12/2011 | Edamatsu et al. | |
| 2012/0051740 A1 | 3/2012 | Arahira | |
| 2012/0134377 A1 * | 5/2012 | Shimizu | H04J 14/02 372/22 |
| 2014/0218747 A1 | 8/2014 | Wong et al. | |
| 2018/0259828 A1 | 9/2018 | Moqanaki et al. | |
| 2020/0041866 A1 | 2/2020 | Qian et al. | |

OTHER PUBLICATIONS

Suzer (2010. Quantum optical applications in spectroscopy: Investigation of entangled two-photon absorption and entangled two-photon excited fluorescence in organic dendritic systems (Doctoral dissertation, University of Michigan). (Year: 2010).*

Svozilík (2012. High spatial entanglement via chirped quasi-phase-matched optical parametric down-conversion. Physical Review A—Atomic, Molecular, and Optical Physics, 86(5), p. 052318) (Year: 2012).*

Jabir, M.V. and Samanta, G.K., 2017. Robust, high brightness, degenerate entangled photon source at room temperature. Scientific reports, 7(1), p. 12613. (Year: 2017).*

Hodelin, J.F., Khoury, G. and Bouwmeester, D., 2006. Optimal generation of pulsed entangled photon pairs. Physical Review A—Atomic, Molecular, and Optical Physics, 74(1), p. 013802. (Year: 2006).*

Riazi (Riazi, 2019. Biphoton shaping with cascaded entangled-photon sources. npj Quantum Information, 5(1), p. 77.) (Year: 2019).*

Oka ( 2011. Selective two-photon excitation of a vibronic state by correlated photons. The Journal of chemical physics, 134(12).) (Year: 2011).*

Wienhold, M., Kirkpatrick, A., Xu, T., Ripp, S., Sayler, G. and Close, D., 2021. Improvements in smartphone and night vision imaging technologies enable low cost, on-site assays of bioluminescent cells. Frontiers in Bioengineering and Biotechnology, 9, p. 767313. (Year: 2021).*

Oka, H., 2011. Selective two-photon excitation of a vibronic state by correlated photons. The Journal of chemical physics, 134(12). (Year: 2011).*

Georgiades, N., et al., "Nonclassical Excitation for Atoms in a Squeezed Vacuum", Physical Review Letters, Nov. 1995, pp. 3426-3429, vol. 75, No. 19.

Fei, H-B., et al., "Entanglement-Induced Two-Photon Transparency", Physical Review Letters, Mar. 1997, pp. 1682-1682, vol. 78, No. 9.

Dayan, B., et al., "Nonlinear Interactions with an Ultrahigh Flux of Broadband Entangled Photons", Physical Review Letters, Feb. 2005, pp. 043602-1-043602-4, vol. 94.

Lee, D-I., et al., "Entangled Photon Absorption in an Organic Porphyrin Dendrimer", J. Phys. Chem. B, 2006, pp. 25582-25585, vol. 110, No. 51.

Eshun, A., et al., "Investigations of Thienoacene Molecules for Classical and Entangled Two-Photon Absorption", J. Phys. Chem. A, 2018, pp. 8167-8182, vol. 122.

Guzman, A.R., et al., Spatial Control of Entangled Two-Photon Absorption with Organic Chromophores, J. Am. Chem. Soc., 2010, pp. 840-7841, vol. 132.

Villabona-Monsalve, J.P., et al., "Entangled Two Photon Absorption Cross Section on the 808 nm Region for the Common Dyes Zinc Tetraphenylporphyrin and Rhodamine B", J. Phys. Chem. A, 2017, pp. 7869-7875, vol. 121.

Upton, L., et al., "Optically Excited Entangled States in Organic Molecules Illuminate the Dark", J. Phys. Chem. Lett., 2013, pp. 2046-2052, vol. 4.

Villabona-Monsalve, J.P., et al., "Two-Photon Excitation of Flavins and Flavoproteins with Classical and Quantum Light", J. Am. Chem. Soc., 2018, pp. 14562-14566, vol. 140.

Parzuchowski, K.M., et al., "Setting bounds on two-photon absorption cross-sections in common fluorophores with entangled photon pair excitation", Phys. Rev. Applied 15, 2020, arXiv:2008.02664, pp. 1-22.

Tabakaev, D., et al., "Energy-Time Entangled Two-Photon Molecular Absorption", Phys. Rev. A 103, 2019, arXiv:1910.07346, pp. 1-5.

Extended European Search Report dated Nov. 29, 2023 for European Patent Application No. 20897218.2.

Guillet De Chatellus, H., et al., "Non-collinear and non-degenerate polarization-entangled photon generation via concurrent type-I parametric downconversion in PPLN", Optics Express, Oct. 2006, pp. 10060-10072, vol. 14, No. 21.

Titchener, J.G., et al., "Generation of photons with all-optically reconfigurable entanglement in integrated nonlinear waveguides", arxiv.org, Cornell University Library, Nov. 2014.

Fanto, M.L., et al., "A Bright PPKTP Wave guide Source of Polarization Entangled Photons", Proceedings of SPIE, May 2015, pp. 950014-950014, vol. 9500.

PCT International Search Report and Written Opinion dated Apr. 6, 2021 for PCT Application No. PCT/US2020/063056.

Frank Schlawin et al. Entangled Two-Photon Absorption Spectroscopy. Accounts of Chemical Research. Sep. 2018, vol. 51, No. 9, pp. 2207-2214.

Non-Final Office Action dated Dec. 14, 2021 for U.S. Appl. No. 17/110,599.

Wong, F. N. C., J. H. Shapiro, and T. Kim. "Efficient generation of polarization-entangled photons in a nonlinear crystal." Laser physics 16.11 (2006): 1517-1524. (Year: 2006).

Chinese Second Office Action (with English translation) dated Sep. 13, 2025 for Chinese Patent Application No. 202080084078.X.

European Examination Report dated Nov. 19, 2025 for European Patent Application No. 20897218.2.

* cited by examiner

ENTANGLED PHOTON SOURCE THAT CAN REPLACE A PULSED LASER IN NON-ABLATIVE MULTIPHOTON AND NONLINEAR PROCESSES

CROSS REFERENCE TO RELATED APPLICATIONS

This application is a continuation under 35 U.S.C. § 120 of U.S. Utility patent application Ser. No. 17/110,599, filed on Dec. 3, 2020, entitled "AN ENTANGLED PHOTON SOURCE THAT CAN REPLACE A PULSED LASER IN NON-ABLATIVE MULTIPHOTON AND NONLINEAR PROCESSES" by Scott K. Cushing, Szilard Szoke, Manni He, and Bryce Hickam," attorney's docket 176.0174-US-U1, which application claims the benefit under 35 U.S.C. Section 119(e) of commonly-assigned U.S. provisional patent application Ser. No. 62/942,806, filed on Dec. 3, 2019, by Scott K. Cushing, Szilard Szoke, Manni He, and Bryce Hickam, entitled "AN ENTANGLED, CONTINUOUS WAVE, PHOTON SOURCE THAT CAN REPLACE A PULSED LASER IN NON-DESTRUCTIVE, MULTIPHOTON OR NONLINEAR OPTICAL DEVICES," client reference CIT-8401-P, both of which applications are incorporated by reference herein.

BACKGROUND OF THE INVENTION

1. Field of the Invention

This invention relates to sources of entangled photons and methods of making and using the same.

2. Description of the Related Art

Ti:Sapphire, Nd-YAG, dye-based, and fiber-based laser amplifiers, amongst other pulsed laser sources, can provide peak powers in the range of $kW/cm^2$ to $TW/cm^2$ or higher. The pulse-width ranges from a few femtoseconds to nanoseconds and longer. Such high-power lasers allow for material cutting and patterning, driving market growth in industrial and medical settings. The same lasers also allow for multiphoton nonlinear spectroscopy, measurement, and imaging that is not possible without high peak electric field intensities. The high peak field intensity overcomes the small cross section, defined as the measure of probability that an absorption or scattering event will take place, of the multiphoton nonlinear processes. Pulsed lasers also allow for ultrafast and time-resolved spectroscopy, where ultrafast is defined as a temporal resolution faster than microseconds. The applications of nonlinear spectroscopy range from, but are not limited to, multiphoton imaging of biological systems, multiphoton ultrafast control of quantum systems, proposals for optical computation, complex holographic displays, information storage devices, and time-resolved or stroboscopic measurements.

While necessary for multiphoton nonlinear techniques, pulsed lasers have undesirable factors when compared to continuous wave lasers as used commonly in single-photon spectroscopies. The undesirable factors of pulsed lasers include increased maintenance, cost, power supply requirements, specialized training, sample destruction and ablation, and overall form factor when compared to a pulsed to continuous wave laser. The stated factors limit the commercial viability and mass-application of most multiphoton and nonlinear techniques (imaging or measurement) and they are mainly used in specialized laboratory spaces that require doctoral levels of education. In comparison, the operation, maintenance, training, and form factors of continuous wave diode laser sources now approach the complexity and power requirements of a household lamp and are widely used in commercial linear optical applications such as optical disk drives, absorption measurements, bar-coding, and medical treatments amongst others. Therefore, it is desirable to have a photon source that could perform nonlinear multiphoton spectroscopy but with the same implementation and lower intensities of a continuous wave source.

Entanglement between photons can be characterized by a state which displays quantum correlations in any of the photonic degrees of freedom, such as polarization, energy, and momentum, amongst others. Since the two generated photons originate from a single parent photon, conservation laws dictate the preservation of the original quantum numbers associated with the parent photon. The down-converted photons are necessarily entangled, meaning that any measured property of one of the photons allows one to predict with certainty the corresponding property of the other. Mathematically, the entangled state is defined as a quantum mechanical superposition of two or more wavefunctions such that the combined wavefunction is not factorable into a product of the two or more individual wavefunctions.

When two or more entangled photons are involved in an optical process, defined as the interaction of light with matter, their quantum correlations can make the multiple photons appear as the single parent photon in terms of the time-ordered light-matter interaction. The probability of the multiphoton event caused by the time-ordered interaction of the entangled photons and matter is therefore proposed to approach or be equal to the probably of a single-photon optical process. The entangled multiphoton nonlinear process scales as a one photon event (linear) with a one-photon cross section and requires one-photon type intensities rather than scaling as a multiphoton interaction (quadratic or higher) with a multiphoton cross section and multiphoton high peak field intensities. The temporal-spectral correlations that are created between the entangled photons also result in distinct temporal or pulse-like properties without using a pulsed laser. An entangled continuous wave source can therefore replace multiphoton nonlinear spectroscopy and ultrafast time resolved spectroscopy exclusive to pulsed lasers, but not ablative and destructive methods that require high peak field intensities.

The other implication of the entangled photon light-matter interaction is that the entangled multiphoton process can interact with or create quantum correlations within the matter in such ways that classical photons cannot. The change in these quantum correlations gives rise to entangled photon spectroscopies that extract non-classical information from matter. Entangled photon spectroscopies may include interactions among qubits, many-body states, or other quantum phenomena, amongst others. The quantum correlations between the entangled photons can also provide non-Fourier restricted spectral and temporal resolutions that are not possible with a classical photon source. The quantum correlations between the entangled photons can be controlled during or after entangled state creation to change the temporal resolutions from a few-femtoseconds to longer with a spectral resolution given by the linewidth of the continuous wave pump laser.

For example, entangled two-photon processes have been measured to scale linearly with the incident power. Kimble et al showed an entangled two-photon process in Cs (Georgiades, N. P., Polzik, E. S., Edamatsu, K., Kimble, H. J, and Parkins, A. S., 1995. Nonclassical excitation for atoms in a squeezed vacuum. *Physical Review Letters,* 75(19), p. 3426.). Teich et al showed an entangled two photon process in $H_2$ (Fei, H. B., Jost, B. M., Popescu, S., Saleh, B. E. and Teich, M. C., 1997. Entanglement-induced two-photon transparency. *Physical Review Letters,* 78(9), p. 1679.). Silberberg et al showed an entangled two-photon process in sum frequency generation (Dayan, B., Pe'er, A., Friesem, A. A. and Silberberg, Y., 2005. Nonlinear interactions with an ultrahigh flux of broadband entangled photons. *Physical Review Letters,* 94(4), p. 043602.). Goodson et al. showed two photon absorption in various inorganic and organic molecules (Lee, D. I. and Goodson, T., 2006. Entangled photon absorption in an organic porphyrin dendrimer. *The Journal of Physical chemistry B,* 710(51), pp. 25582-25585.). Entangled two-photon processes have therefore been proven to scale as a classical one photon process. None of these experiments have measured a multiphoton cross section that is exactly equal to that of a single photon process, only approaching that of a single photon process.

The complete realization of an entangled photon source that can completely convert a multiphoton process into a single photon process has not yet been created. The complete realization of an entangled source that benefits from more than one non-classical aspects of entangled photons in measurements has not yet been reported. The complete realization of an entangled source that can replace a pulsed laser in all multiphoton nonlinear and time resolved spectroscopies has not yet been created. These failures result from the following issues in entangled photon spectroscopy sources to date: First, the measured absorption cross sections are always lower than the relevant single photon absorption cross section because sufficient control and purity of the entangled photon state is not achieved. Second, even with the reported enhancements in entangled multiphoton nonlinear cross sections, the flux of entangled photons being generated by the entangled source is such that, on average, the signal levels from the spectroscopy have not approached or exceeded that of pulsed laser multiphoton nonlinear processes. Third, the low flux of entangled photons created by the entangled source necessitates highly sensitive single photon avalanche photodetectors with maximal photon counts of $10^7$ photons/s which is less than $10^{-12}$ of a Watt for the current state of the art. The photodetector technology is specialized and costly compared to that of mass-market photodiodes and CCD type optical cameras. Fourth, the broad-bandwidth required for few femtosecond measurements and higher fluxes has not yet been applied to multiphoton spectroscopy because the complex spectral, temporal, phase, and angular dispersion makes it difficult to connect with subsequent optical manipulation and measurement techniques. Fifth, the implementation of the entangled photon source in previous reports still involves the use of complex, costly, and scientifically precise optical interferometric systems, as well as non-trivial optical design principles for the generation of entangled, down-converted photon pairs which often rely on a pulsed laser. Together, these limitations have prevented the reality of using entangled photons as a replacement for pulsed lasers in multiphoton or nonlinear processes. There is accordingly still a need to replace pulsed lasers with a continuous wave based source that would lower power densities, costs, maintenance, training needs, and overall form factor while allowing easy connection with subsequent optical manipulation and measurement stages or easy multiplexing for the creation of more than two entangled photons. The present invention satisfies this need.

SUMMARY OF THE INVENTION

The present disclosure describes a source of entangled photons and methods of making and using the same, the source comprising a waveguide implemented in a nonlinear material outputting entangled photons in response to continuous wave pump photons irradiating the waveguide. The source and methods can be embodied in many ways including, but not limited to, the following examples.

1. The source wherein nonlinear material comprising a spatially varying dielectric nonlinear susceptibility varying along the propagation direction of the pump photons in the waveguide, with the spatially varying dielectric nonlinear susceptibility phase matching the pump photons and the parametrically downconverted entangled photons so as to customize or tailor an interaction of the entangled photons in a multiphoton nonlinear process and for an application using the multiphoton nonlinear process.

2. The source of example 1, wherein the spatially varying dielectric nonlinear susceptibility is tailored so that the entangled photons comprise time-energy entangled photons simulating one or more pulsed photons performing the multiphoton nonlinear process.

3. The source of example 1 or 2, wherein the spatially varying dielectric nonlinear susceptibility tailors quantum correlations of the entangled photons so they act as pulsed photons in performing the multiphoton nonlinear process.

4. The source of any of the examples 1-3, wherein:

the multiphoton nonlinear process comprises absorption or scattering of the entangled photons by a material, and the spatially varying dielectric nonlinear susceptibility is tailored so that the entangled photons are absorbed or scattered by the material with an absorption or scattering cross section matching that of one photon linear processes of one or more pulses of light by the material.

5. The source of any of the examples 1-4, wherein the entangled photons linearize the multiphoton nonlinear process.

6. The source of any of the examples 1-5, wherein:

the nonlinear material comprises a plurality of regions having an arrangement along the propagation direction, and each of the regions between two adjacent regions along the propagation direction having the dielectric nonlinear susceptibility comprising a polarity that is reversed as compared to, or out of phase with, the polarity of the nonlinear susceptibility in the two adjacent regions.

7. The source of example 6, wherein at least one of an arrangement, a periodicity, a length of each of the regions, or an aspect ratio of the waveguide are tailored to optimize the efficiency of the entangled photons in performing a multiphoton nonlinear process.

8. The source of example 7, wherein the periodicity comprises a plurality of periodicities so that the entangled photons have a wider bandwidth simulating pulsed photons performing the multiphoton nonlinear process.

9. The source of claim 7, wherein the length is in a range of 1 mm to 10 cm.

10. The source of claim 6, wherein:

the waveguide comprises a patterned waveguide including a ferroelectric material or a metamaterial, and each of the regions between the two adjacent regions has the dielectric nonlinear susceptibility comprising an electric polarization 180 degrees out of phase with the electric polarization of the two adjacent regions.

11. The source of any of the examples 1-10, wherein the waveguide comprises a patterned waveguide comprising a periodically poled ferroelectric material.

12. The source of any of the examples 1-11, wherein the spatially varying dielectric nonlinear susceptibility is such that the entangled photons are created in response to a spontaneous parametric down-conversion interaction of a field of the pump photons with the nonlinear material and a vacuum field, each of the pump photons being converted to the entangled photons comprising two or more down converted photons.

13. The source of any of the examples 1-12, wherein the nonlinear material comprises Lithium Niobate or Potassium Titanyl Phosphate (KTP) or Lithium Tantalate.

14. The source of any of the examples, wherein the waveguide is not in a resonator.

The present disclosure further discloses an apparatus comprising the source of entangled photons of any of the examples 1-14. The apparatus can be embodied in many ways including, but not limited to, the following.

15. The apparatus including a detector coupled to the material and/or the source for detecting a response of a material to the entangled photons, wherein the multiphoton nonlinear process comprises an interaction of the entangled photons with a material.

16. The apparatus of example 15, wherein the apparatus is an imaging device and the detector forms an image of the material using the entangled photons.

17. The apparatus of claim 15 comprising a spectroscopic apparatus performing time resolved spectroscopy of the material using the entangled photons.

18. A communication or computation system including a plurality of nonlinear elements coupled to the source of entangled photons of any of the examples 1-14 so that the nonlinear elements interact with the entangled photons.

20. An apparatus, comprising a plurality of the sources of any of the examples 1-14 connected in parallel or series; and one or more couplers combining the entangled photons from each of the sources so as to form outputs of multiple entangled photons, entanglements of the entangled photons, or other combinations of the entangled photons.

21. A coherent, entangled photon source which uses a continuous wave laser to replace pulsed photon excitation sources in multiphoton nonlinear processes and time-resolved spectroscopies. The device consists of a continuous wave photon laser which creates electromagnetic radiation at a specific frequency and narrow linewidth. The emitted beam is conditioned by an optical fiber so as to allow for efficient interaction with a nonlinear crystal. The nonlinear material is designed and fabricated in a specific manner, enabling the quantum mechanical process of a single photon with well-defined energy being converted into two or more photons which display quantum correlations. The spectrum of these "down-converted" photons spans an octave or less in frequency. The quantum correlated photons are again fiber coupled at the output. The nonlinear material and subsequent fiber-optic or free space components control the temporal, spatial, and polarization-related quantum correlations such that the entangled photons can create a signal in multiphoton nonlinear and time-resolved processes that is the same or exceeds that of a pulsed photon source but at the average and peak powers of a continuous wave laser.

22. A method for the efficient generation of broadband entangled photons using a continuous wave laser and a specially designed and fabricated nonlinear optical crystal and subsequent optics. The coupling of light from the continuous wave pump laser into the crystal is achieved through the use of fiber optic elements. The parametric down-conversion process responsible for generating entangled photon pairs takes place in a chirped, periodically poled nano-scale waveguide, fabricated on a nonlinear optical material. The time-correlated entangled photon pairs are then coupled out of the waveguide into a photonic crystal fiber, which preserves the single mode spatial distribution of the photonic states over the entire bandwidth produced. The output fiber can be coupled directly to one or more of commercially available beam-splitters, polarization control optics, optical filters, and interferometers, amongst other optical elements for alignment-free manipulation of the quantum photons' degrees of freedom before interacting with a sample. This control over the relative properties of the entangled photon pair such as temporal overlap, spatial overlap, polarization, and spectral tuning allows for the tuning of the entangled photon correlations which influence the final sample interaction. Thus, the nonlinear or multiphoton properties associated with a pulsed laser system can be replicated using a continuous wave source at lower average and peak powers than a pulsed laser. The overall form package can be replicated and daisy-chained such that multiple down-conversion waveguides are pumped simultaneously to allow more than two photons to be entangled in higher order multiphoton nonlinear processes.

23. The present disclosure further discloses a method of irradiating a material, comprising:

irradiating the material with entangled photons from a source so as to perform spectroscopy, imaging, communications, or computing using the entangled photons; and detecting a response of the material to the entangled photons, wherein the source comprises:

a waveguide including a nonlinear material outputting entangled photons in response to continuous wave pump photons irradiating the waveguide; and the nonlinear material comprising a spatially varying dielectric nonlinear susceptibility comprising a polarity varying along a propagation direction of the pump photons in the waveguide, the spatially varying dielectric nonlinear susceptibility phase matching the pump photons and the phase matching tailoring an efficiency of the entangled photons in performing a multiphoton nonlinear process comprising an interaction of the material with the entangled photons; and wherein the interaction comprises scattering of the entangled photons by the material and the entangled photons linearize absorption in the multiphoton nonlinear process.

BRIEF DESCRIPTION OF THE DRAWINGS

Referring now to the drawings in which like reference numbers represent corresponding parts throughout:

FIG. 4A shows entangled two-photon absorption, FIG. 4B shows waveguide output spectral power, FIG. 4C shows measured classical vs. entangled cross-sections and FIG. 4D is a fluorescence comparison. A two-photon nonlinear optical process matching a pulsed laser comprised of the source of entangled photons according to one or more examples described herein, showing the linearity of the two-photon entangled absorption and cross sections for various molecules, showing the output spectral power of a waveguide described in this invention, and comparing the fluorescence intensity from combining the current invention with a linear, entangled two photon absorption cross section. The expected fluorescence intensity from a single photon and entangled two photon process for the same incident power density are compared to the fluorescence intensity from a 1 W, 70 fs, 80 mHz classical laser acting in a classical two photon fluorescence process.

DETAILED DESCRIPTION OF THE INVENTION

In the following description of the preferred embodiment, reference is made to the accompanying drawings which form a part hereof, and in which is shown by way of illustration a specific embodiment in which the invention may be practiced. It is to be understood that other embodiments may be utilized, and structural changes may be made without departing from the scope of the present invention.

Technical Description

The present invention describes various configurations for replacing a pulsed laser in a nonlinear or multiphoton, non-destructive application with an entangled photon source powered using a continuous wave laser. The invention provides a method for optimizing the entangled photon correlations such that the entangled photon process replicates or exceeds pulsed laser systems in a nonlinear or multiphoton optical process while also being able to explore non-classical photonic degrees of freedom.

Figure 1:
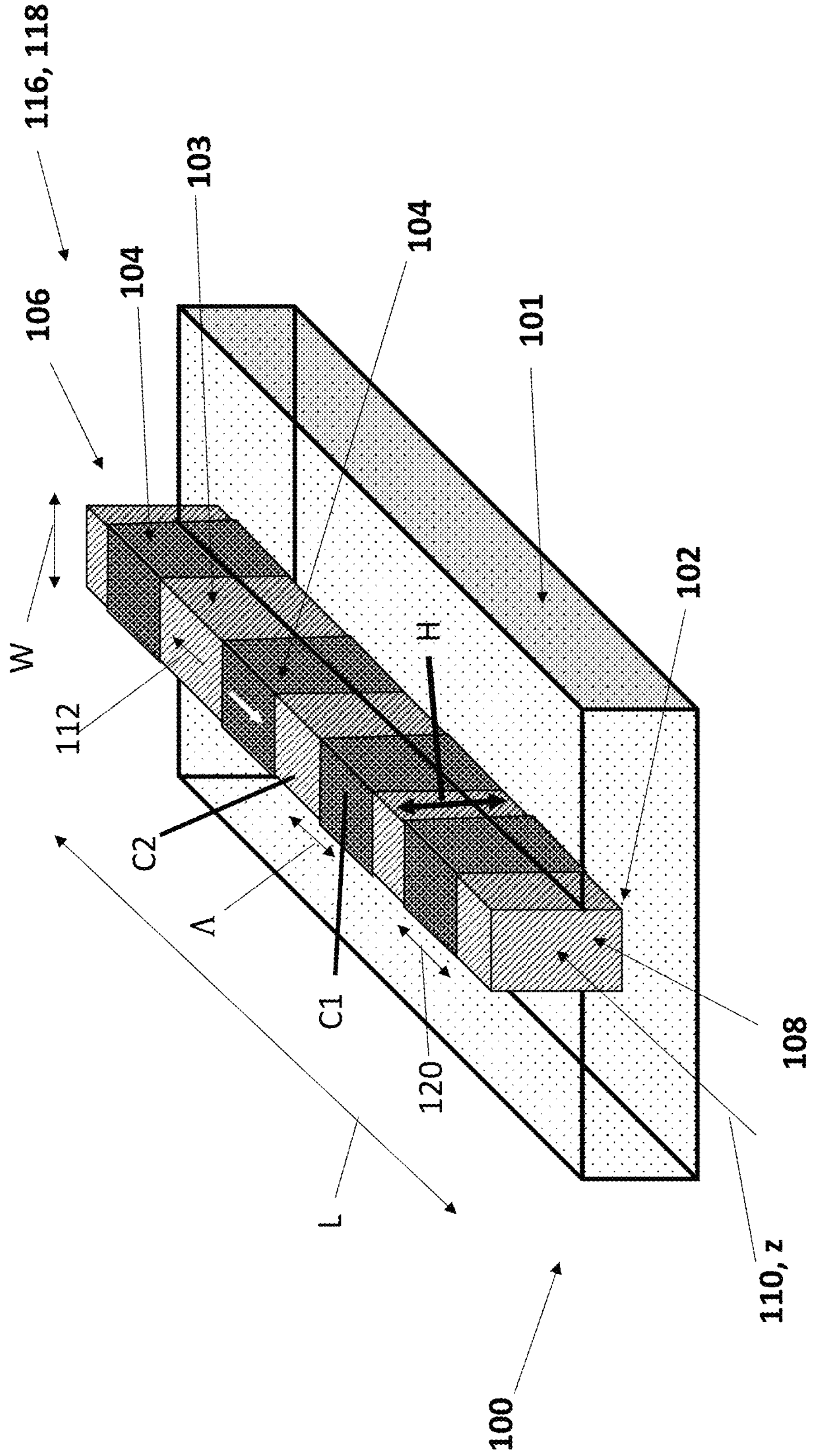
FIG. 1. Schematic of the on-chip entangled photon creation device including the waveguide and possible variants.

FIG. 1 illustrates an example source of entangled photons, comprising a waveguide and including a nonlinear material outputting entangled photons in response to continuous wave pump photons irradiating the waveguide. The nonlinear material comprises a spatially varying dielectric nonlinear susceptibility comprising a polarity varying along a propagation direction of the pump photons in the waveguide. The spatially varying dielectric nonlinear susceptibility phase matches with the pump photons and the phase matching tailors an efficiency of the entangled photons in performing a multiphoton nonlinear process.

1. Example Materials

The generation of entangled photons in simple nonlinear optical crystals relies on the concept of birefringent phase-matching (or otherwise also known as critical phase-matching), whereby the propagation constants of all photon components are made to sum to zero via careful adjustment of the propagation angle of the input beam relative to the non-linear material's crystal axis. In a non-patterned material such as Beta-Barium Borate, the production of entangled photons has an efficiency on the order of $10^{-10}$ to $10^{-12}$. These schemes suffer from limitations in phase-matching over broad bandwidths of electromagnetic radiation ranges while simultaneously maintaining significant entangled photon creation efficiencies. Additionally, birefringent phase-matching has a high sensitivity to misalignment (acceptance angle of the material), as well as an inherent difficulty of collection of the entire down-converted flux, making implementation without precise control systems a hindrance.

A significant improvement can be made by choosing nonlinear materials that have a ferroelectric property, allowing them to be periodically poled. This entails the formation of a periodic lattice via the application of a strong electric field using a patterned electrode, which inverts the domain orientation of the material in select areas and thereby also the direction of the effective nonlinear coefficient in the material. This domain inversion technique allows for momentum conservation to still be satisfied inside the nonlinear crystal, with the additional momentum contribution coming from the periodic structure.

Due to the fact that the periodic poling pattern is adjustable depending on what polarization combination one desires to use for the multiple photons (pump-signal-idler) that take part in this down-conversion process, it becomes possible to utilize stronger elements of the nonlinear tensor of the material and thereby increase the down-conversion efficiency leading to high-brightness sources. Furthermore, as the poling pattern can be arbitrarily optimized, it becomes possible to design nonlinear materials that can operate close to room-temperature as opposed to in the high-temperature regime as for the case with birefringent phase matching. Furthermore, the poling pattern can be defined in an arbitrary manner, and hence the phase matching condition can be made to be satisfied for a large variety of electromagnetic radiation. This is specifically done by designing a grating with a longitudinally varying poling period, such that the wave-vector mismatch at various wavelengths is now compensated for at different points along the nonlinear material. The produced electromagnetic radiation can span, but is not limited to, an octave in bandwidth. Furthermore, by confining the electromagnetic radiation to a waveguide type geometry, the entangled photon production efficiency can reach or surpass $10^{-7}$ as compared to the non-patterned example at $10^{-10}$ to $10^{-12}$. A schematic of such a design is shown in FIG. 1. As illustrated in FIG. 1, the waveguide or on-chip device is created on a substrate (101) and may be (102) partially, fully, or not embedded in such substrate. The waveguide or on-chip device itself may be patterned with a regularly periodic or with a continuously slowly varying (chirped) periodicity. More complex poling patterns over the total length of the waveguide for maximizing the entangled photon interactions for a specific application are also viable.

When using a patterned material, the choice of materials can increase as compared to the non-patterned case. Lithium Niobate (LN) is a very common choice of material when it comes to quantum frequency conversion applications due its relatively low coercive field strength (making domain engineering via poling easier) and the extremely wide transparency window (350 nm-5000 nm) which makes it ideal for a wide variety of applications. The drawback to LN however is its quite low photorefractive damage threshold. Although this still makes it well suited for applications where power-levels are generally sub-100 mW. Although from a material science standpoint, doping LN with Magnesium Oxide (MgO) at a 5%-10% concentration quite significantly increases its power handling capabilities by inhibiting grain growth in the material, it's still not an effective choice for >1

W pump power levels. Furthermore, the transmittance of LN in the ultraviolet electromagnetic radiation range drops rapidly.

Amongst a variety of different materials with similar or better properties, Lithium Tantalate (LT) offers the benefits of higher power handling capabilities, higher resistance to photorefractive effects, and a higher nonlinear coefficient than LN. It also possesses a lower coercive field (1.7 kV/mm) than LN which improves the quality of periodic poling and its transmittance window extends further into the UV wavelength range.

Specifically, for the case of frequency conversion from 406 nm to 812 nm, the quasi-phase matching condition in LT is able to be satisfied through third-order phase-matching (i.e. flipping the polarization every three coherence lengths of the electromagnetic radiation) with a fundamental poling period $K_0$ of ~9.8 μm depending on the variation in stoichiometry of the material. To obtain a wide bandwidth visible/near-IR entangled photon flux around the degenerate 812 nm wavelength, a linear chirping of the periodic structure is introduced whereby the center of the crystal is taken as the point where the chirping function leaves the phase matching unchanged. A ~10% variation around the 9.8 μm poling period satisfying degenerate down-conversion can broaden the bandwidth by ~500 nm. By changing the poling period, chirp rate, and quasi-phase matching the center wavelength of the waveguide can be changed from the ultraviolet to infrared range.

2. Example Coupling Schemes

Figure 2:
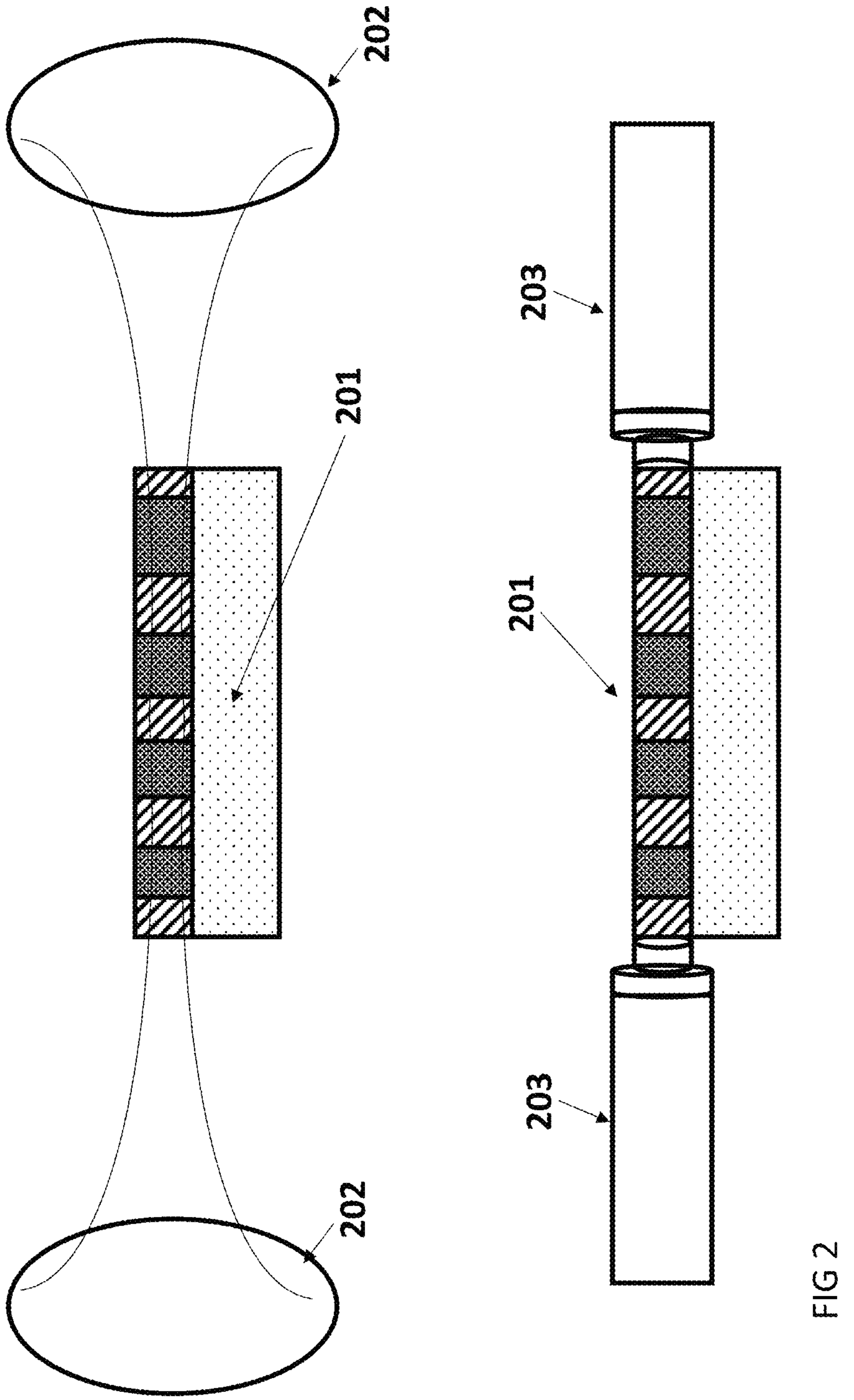
FIG. 2. Drawing of the device in a free space and a fiber optic configuration.

The possibility of nanofabrication of the non-patterned material allows for adoption in completely on-chip systems. By focusing the electromagnetic radiation to a greater extent, the efficiency with which the down-conversion process takes place can be increased, leading to more brilliant sources of entangled photons on a per-mW basis. Furthermore, the waveguide form factor allows for outcoupling of the produced entangled photon flux directly into an optical fiber or free-space optics. FIG. 2 shows the waveguide or on-chip geometry (201) described in FIG. 1 can be coupled with electromagnetic radiation using free space optics (202), fiber optics (203), or any variation between these two extremes. Fiber optic coupling from the source to the application prevents the need for meticulous realignment of the optical system, allows for a more compact and robust footprint, and allows the source to easily be used in multiple applications.

3. Example Design Rules

Figure 3:
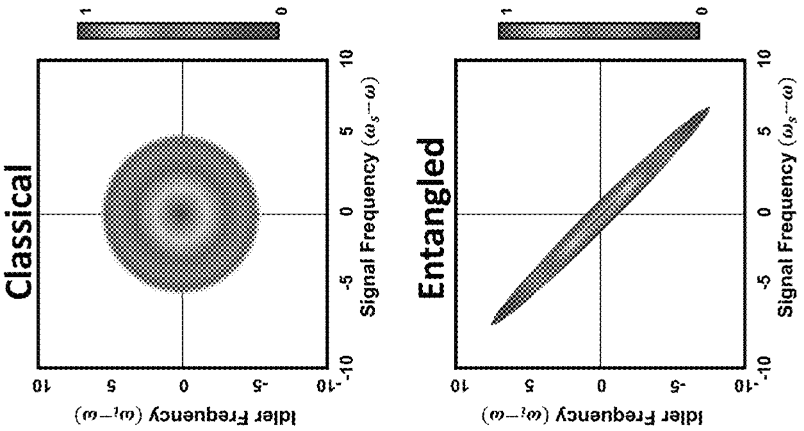
FIG. 3. Plot of the entangled photon frequency correlation showing the entangled electromagnetic radiation produced by the device exhibits non-classical energy-time correlations.

The time-correlations of the produced entangled photons can be changed from a few femtoseconds to longer. One way to achieve this is to use free space optics and a pulse-shaping technology that controls the arrival time of different wavelength photons such as through prisms, gratings, mirrors, spatial light modulators, or nonlinear optical elements. An alternative implementation would utilize fiber optic components to achieve the same level of necessary control. Using such methods, the time and frequency correlations of the entangled photons created by the waveguide or on-chip material can be optimized for a nonlinear or multiphoton process (FIG. 3). This can be achieved through the routes listed above or other combinations of current optical technologies.

In order to define the parameters of the waveguide which is responsible for the generation of the entangled photon pairs, the following design rules optimize the down-conversion process for a specific wavelength and bandwidth while retaining its quantum (i.e. single/entangled photon) behavior for subsequent use in multiphoton nonlinear processes:

1. The poling periodicity (i.e. unit cell distance) Λ is to be calculated through the quasi phase-matching condition of $\Delta k - 2\pi/\Lambda = \Delta k_{QPM}$, where $\Delta k = k_p - k_s - k_i$, whereby each k-vector for the pump, signal, and idler is defined in its usual form of $k = 2\pi/\lambda$. In order to find the optimum value of Λ for a given SPDC wavelength combination, the above equation is plotted for a range of values of Λ using some material-specific temperature-dependent Sellmeier equations, and then numerically evaluated to find its root, where $\Delta k_{QPM} = 0$.
2. The cross-sectional dimensions of the waveguide are to be chosen such that higher-order propagation modes are as suppressed as possible. Enforcing only fundamental waveguide modes to be excited by reducing the height and width of the waveguide serves a two-fold purpose. Firstly, higher-order modes lower the SPDC flux which is generated by the pump and complicates optical coupling, thus leading to a decrease in output and purity and thus in extreme cases limiting the benefit of a nanophotonic implementations versus that in a bulk crystal. Second, the spurious entangled photons generated via the higher-order modes only contribute to the output signal as noise, due to significantly differing dispersion properties. Furthermore, the expected power spectral density of the entangled photons at the output scales as $1/A_i$, where $A_i$ is the interaction area defined as the area within which the pump, signal, and idler fields overlap. Tighter confinement of the propagating modes therefore results in brighter emission.
3. The cross-sectional dimension of the waveguide should also be chosen according to the proposed input pump power. Extremely tight confinement of the optical modes inherently results in much higher local power densities and therefore larger amounts of heat that needs to be dissipated. The expected power spectral density of the entangled photons scales linearly with the pump power P, however the power dissipation from a cross-sectional area $A_i$ will be highly material and geometry specific. A numerical thermal transfer analysis can be used to explore how far the minimization of the cross-sectional dimensions can be pushed, before thermal damage to the structure becomes an issue.
4. The total length of the waveguide is to be chosen by considering two interlinked criteria. Firstly, the expected power spectral density of the entangled photons at the output scales as $L^2$, where L is the total length of the waveguide. Emission intensity can therefore be significantly increased by utilizing longer structures. Conversely, the expected power spectral density also depends on a multiplicative factor of $\mathrm{sinc}^2(\Delta k L/2)$. Hence, longer waveguides result in narrower emission bandwidths. This 'dual'-argument also applies to poling patterns which have a chirp, as while increasing the amount of variation in the poling periodicity serves to broaden the emission bandwidth, each spectral component will be less populated with photons and thus less brilliant.
5. The amount of chirp α, defined as the percentage change between the unit cell distance at the beginning and end of the waveguide, introduced into the poling periodicity is to be chosen according to the shortest decoherence process of the matter to be imaged or measured. Together with the total length of the waveguide L, these two parameters set the bandwidth of the entangled photon pairs and thus the temporal correlation between photons. As time and frequency are conjugate variables, they are Fourier transform duals. Therefore, localization in the time domain inherently leads to a spread in the frequency domain and vice versa. Given a sample of interest, the bandwidth spanned by the entangled photons should be optimized so as to match the shortest decoherence time of the excited state or the lifetime of the intermediate state used to enable a two-photon transition to occur. To do this, the down-converted spectrum can be numerically simulated for a range of values of α, from which one can extract a functional relationship between the bandwidth and α. A suitable value of chirp can then be chosen such that the generated spectrum corresponds to an effective pulse duration in the time-domain which is optimized for the multiphoton nonlinear process in terms of sample-specific quantities.

4. Example Applications and Configurations of the Source of Entangled Photons a. Absorption Measurements

Figure 4A:
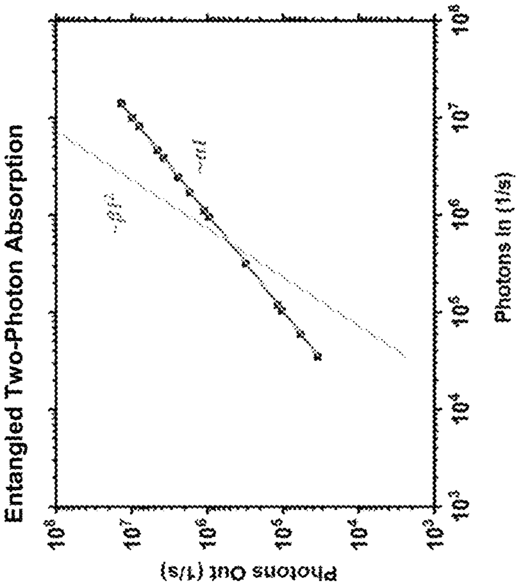
FIGS. 4A-4D.
Figure 4B:
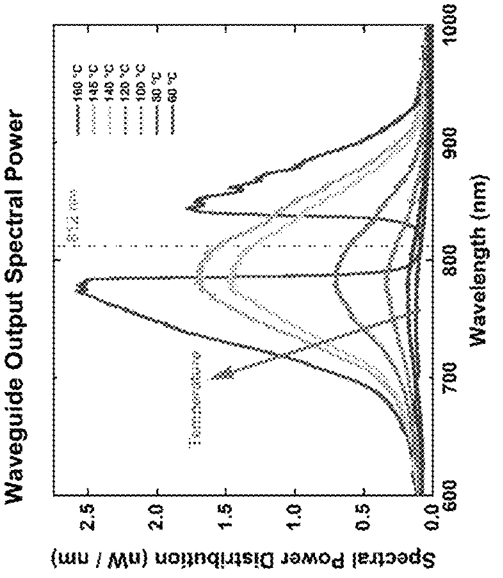

Using such waveguides, the higher efficiency and resultant greater flux of entangled photons, a continuous wave source can be used to replicate or surpass nonlinear or multiphoton processes driven by pulsed lasers. For example, consider the entangled two photon absorption shown in FIG. 4. The linearity of the entangled two photon absorption is shown for a representative molecule commonly used in classical two photon imaging (FIG. 4A). The linearity of the multiphoton process is clearly seen. The measurements were performed using the above mentioned technology in free space, fiber based, or hybrid geometries to the same result. The entangled photons were tested on multiple continuous wave sources such as continuous wave laser diodes and Ti:Sapphire oscillators to confirm that the invention worked as described. For the discussed measurements, the entangled photon source was designed to create entangled photons at an efficiency of $10^{-7}$ or greater centred around 406 nm as previously mentioned. The resultant entangled flux can be measured using a common camera such as integrated in a mobile phone and does not require specialized scientific equipment unlike previous entangled photon sources. The entangled flux is visible to the eye greatly facilitating the alignment and operation of the encompassed optics or application. The spectral power density of an example entangled photonsource as described in this invention is shown (FIG. 4B).

Figure 4C:
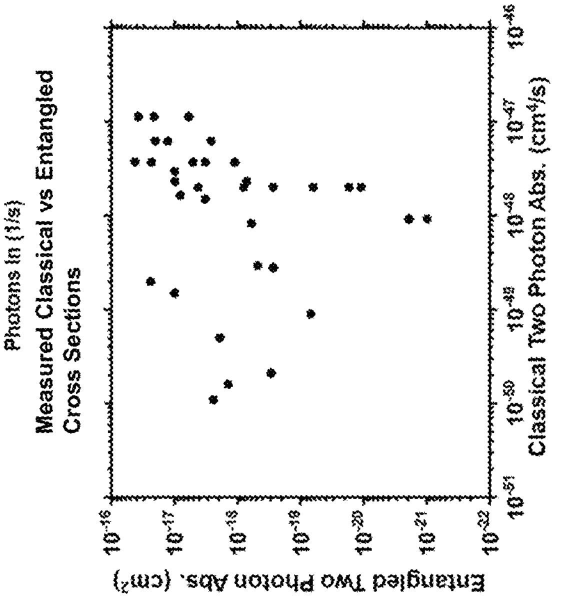

A collection of measured entangled two photon absorption cross sections in scientific literature for various representative molecules is also shown (FIG. 4C). These cross sections are measured using various waveguides and nonlinear crystals different from the proposed invention but are included to demonstrate the universality of the fundamental science behind linear entangled two photon process (A. Eshun, Z. Cai, M. Awies, L. Yu, T. Goodson, Investigations of Thienoacene Molecules for Classical and Entangled Two-Photon Absorption, J. Phys. Chem. A 2018, 122 (41), 8167-8182; A. R. Guzman, M. R. Harpham, Ö. Süzer, M. M. Haley, T. G. Goodson, Spatial Control of Entangled Two-Photon Absorption with Organic Chromophores, J. Am. Chem. Soc. 2010, 132 (23), 7840-7841; J. P. Villabona-Monsalve, O. Calderón-Losada, M. Nuñez Portela, A. Valencia, Entangled Two Photon Absorption Cross Section on the 808 Nm Region for the Common Dyes Zinc Tetraphenylporphyrin and Rhodamine B, J. Phys. Chem. A 2017, 121 (41), 7869-7875; L. Upton, M. Harpham, O. Suzer, M. Richter, S. Mukamel, T. Goodson, Optically Excited Entangled States in Organic Molecules Illuminate the Dark, J. Phys. Chem. Lett. 2013, 4 (12), 2046-2052; J. P. Villabona-Monsalve, O. Varnayski, B. A. Palfey, T. Goodson, Two-Photon Excitation of Flavins and Flavoproteins with Classical and Quantum Light, J. Am. Chem. Soc. 2018, 140 (44), 14562-14566; K. M. Parzuchowski, A. Mikhaylov, M. D. Mazurek, R. N. Wilson, D. J. Lum, T. Gerrits, C. H. Camp Jr., M. J. Stevens, R. Jimenez, Setting Bounds on Two-Photon Absorption Cross-Sections in Common Fluorophores with Entangled Photon Pair Excitation, 2020, arXiv: 2008.02664; D. Tabakaev, G. Haack, H. Zbinden, R. Thew, On the Role of Entanglement in Entangled Two-Photon Absorption Molecular Spectroscopy, 2019, arXiv: 1910.07346).

Figure 4D:
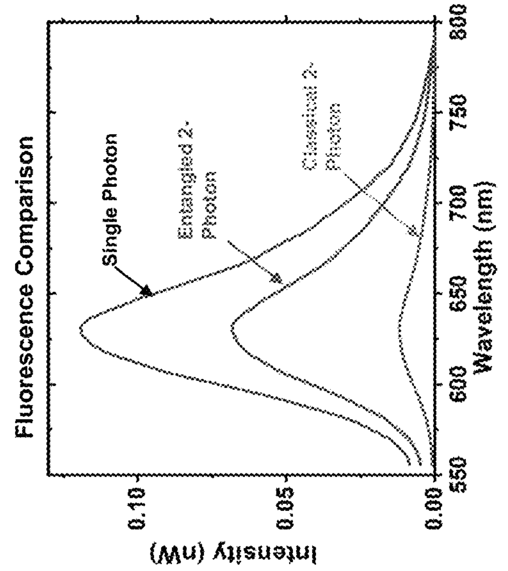

Combining the waveguide source of this invention with a two-photon absorption cross section gives an entangled two-photon fluorescence intensity that is within one order of magnitude of the classical single photon process using a similar continuous wave source (FIG. 4D). The fluorescence intensity that results from a pulsed laser driven, classical two photon fluorescence process is also shown (FIG. 4D). Despite being at over one million times the power of the entangled source, the classical fluorescence is less than the entangled light source. This is because the waveguide or on-chip material can be tuned to create temporal correlations in the entangled photons that are matched to the timescale of the two-photon light absorption and fluorescence process as outlined in the invention.

b. Series and Parallel Configurations

The implementation of the waveguide together with a compact fiber optic package allows for a temporally matched correlation time, a higher efficiency generation of entangled flux, and a more compact form factor than previously reported. When the technology is applied multiple times in series or in parallel within a waveguide (FIGS. 5 and 6), the same technology will work for the creation and application of more than two entangled photons to replicate three or more photon nonlinear processes at one photon rates and cross sections.

Figure 5:
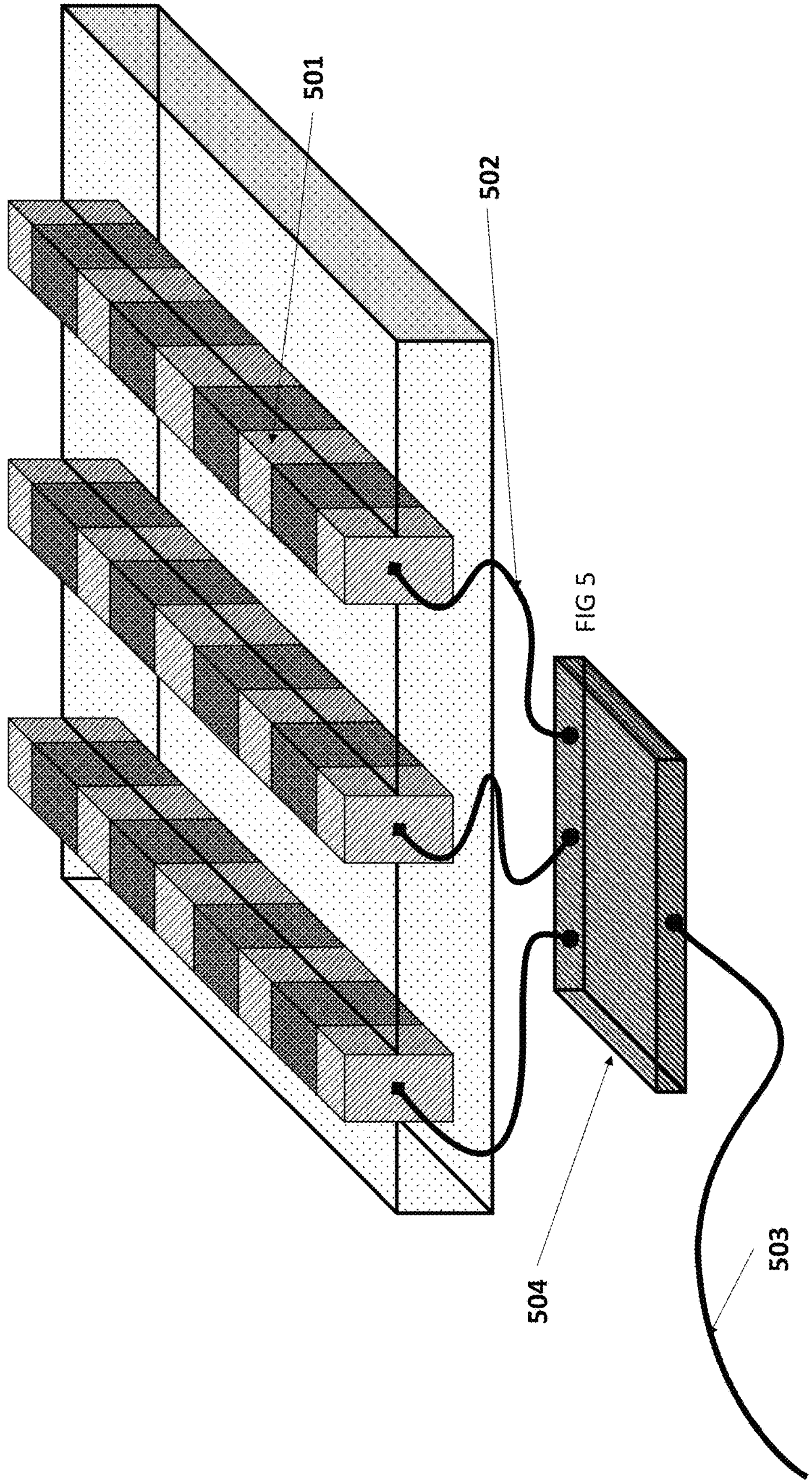
FIG. 5. Simultaneous pumping scheme for multiple waveguides.

FIG. 5 shows a simultaneous waveguide (501) pumping scheme using fiber optics (502). The light from a laser propagating in an input fiber (503) is distributed using a 1×N fiber splitter consisting of a set of cascaded 50:50 fiber beamsplitters (504) to pump an array of down-conversion waveguides, each producing pairs of entangled photons.

Figure 6:
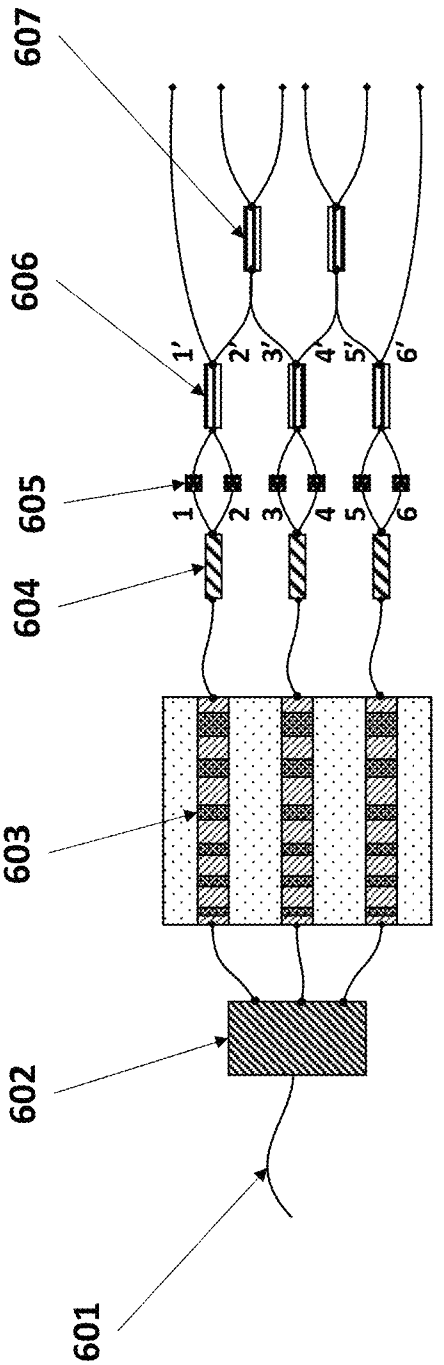
FIG. 6. Scheme for generation of N photon entangled states.

FIG. 6 shows a scheme for generation of a 6-photon entangled GHZ state. An input fiber carrying pump light (601) is connected to a 1×N fiber splitter (602) to redistribute light across array of identical Type-II SPDC waveguides (603) on a single substrate. The down-converted single photons in orthogonal polarization states are separated using a 1×2 fiber polarization beamsplitter (604). The polarization and time delay in each output arm is controlled (605). This is followed by a recombination on a 2×2 fiber polarization beamsplitter (606) to entangle the initially generated photon pairs (1&2, 3&4, 5&6). Then, a further pair of 2×2 fiber polarization beamsplitters (607) are used to entangle photon pairs in the spatial modes 2'&3', and 4'&5' respectively.

The entangled photons that are created can be applied to any multiphoton or nonlinear process where material destruction is not desired. Thus, embodiments of the present invention decrease complexity, increase signal to noise levels, lower costs, and simplify maintenance and training as compared to a pulsed source system. Immediate applications to consider are, but not limited to, multiphoton imaging systems, optical memory storage, optical computers, optical displays, optical communication, quantum lithography, and general use of nonlinear processes wherein the properties of pulsed lasers are technology limiting.

c. Example Experimental Apparatus

Figure 7:
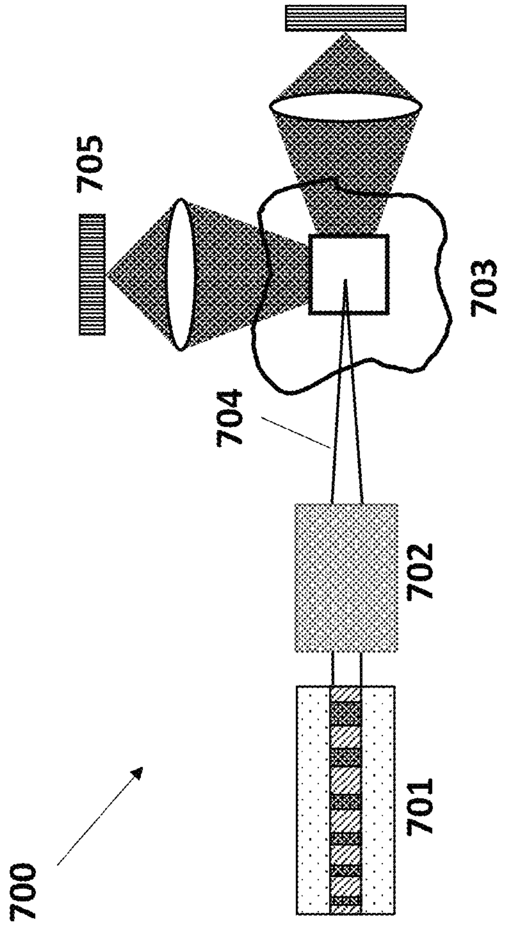
FIG. 7. One realization of an experiment comprised of the source of entangled photons according to embodiments described herein and subsequent optics and detection for measurement or imaging type techniques.

A general experimental apparatus (700) that can be built using the invention is shown in FIG. 7. The entangled source of two or more photons (701) is coupled into a series of waveguides, beam splitters, or other optical elements (702) that control the temporal, spectral, phase, and amplitude relationships, amongst others, for the experiment. The entangled photons are incident on a sample (703) and the absorption, transmission, scattering, reflectance, or absorbance is detected at some angle relative to the incident beam (704) and as a function of any manipulation of the entangled states.

5. Process Steps

Figure 8:
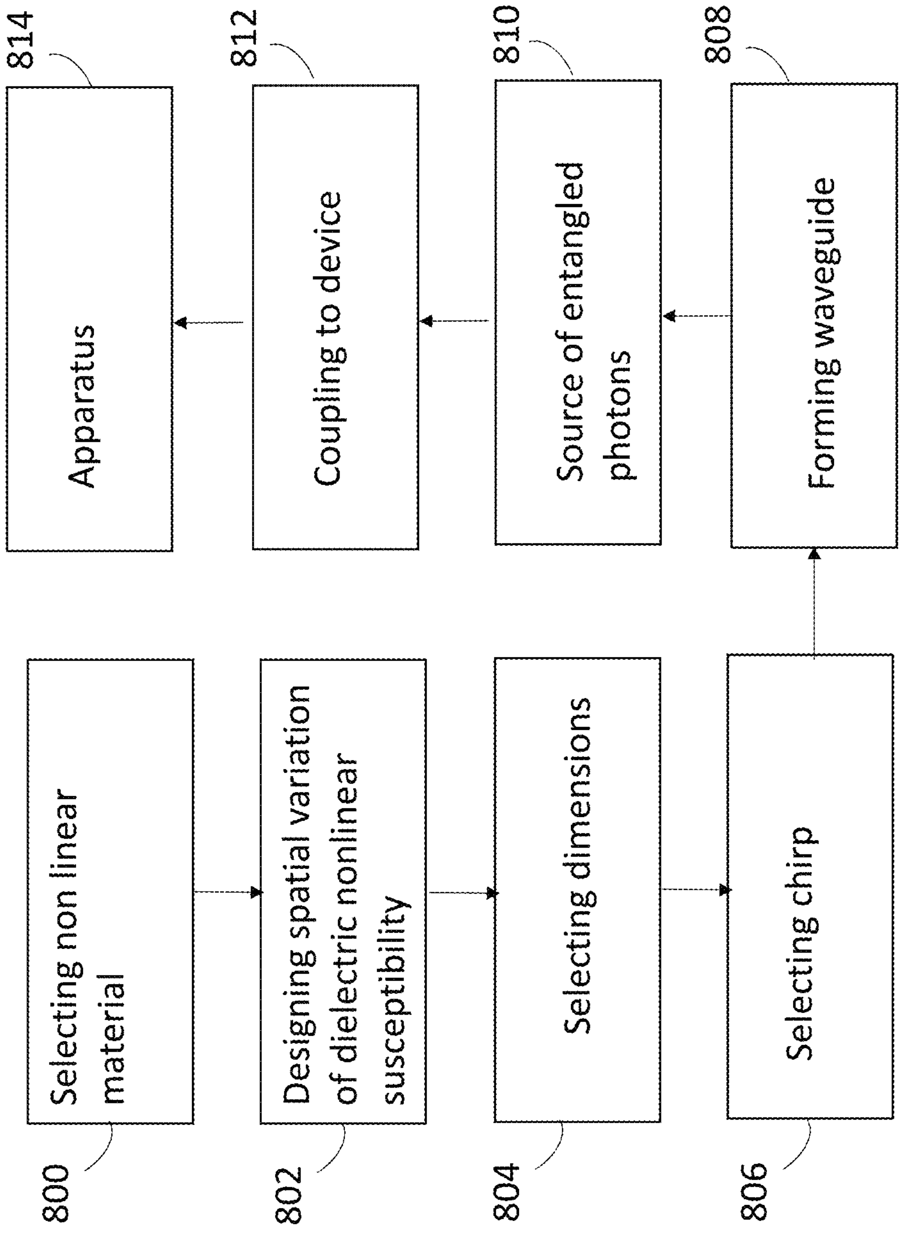
FIG. 8 is a flowchart illustrating a method of making source of entangled photons, according to one or more examples.

FIG. 8 is a flowchart illustrating a method of making a source of entangled photons according to one or more examples (referring also to FIGS. 1-7).

Block 800 represents selecting a nonlinear material capable of outputting entangled photons in response to continuous wave pump photons irradiating a waveguide comprising or implemented in the non-linear material, wherein the entangled photons are formed by a parametric down-conversion (SPDC) of the pump photons.

Block 802 represents designing a spatial variation of the dielectric nonlinear susceptibility $\chi^{(2)}(z)$, which is a proportionality constant indicating the degree of polarization that a material undergoes in response to an applied electric field, of the nonlinear material along a direction comprising the propagation direction of the pump photons in the waveguide (where z is the position along the propagation direction), so that the spatially varying dielectric nonlinear susceptibility phase matches the pump photons and the parametrically down-converted entangled photons. In one or more examples, $\chi(z)$ is at least one of a second order dielectric nonlinear susceptibility or a third order dielectric nonlinear susceptibility. In one or more examples, the spatially varying nonlinear susceptibility is defined by adjacent regions 103, 104 each comprising a unit cell having different orientation of the nonlinear susceptibility (first region 103 adjacent second region 104) and separated by a unit cell distance $\Lambda$ (e.g., the distance between center C1 of the first region and the center C2 of the second region). $\Lambda$ is calculated through the quasi phase-matching condition of $\Delta k-2\pi/\Lambda=\Delta k_{QPM}$, where $\Delta k=k_p-k_s-k_i$, whereby each k-vector is defined in its usual form of $k=2\pi/\lambda$. In one or more examples, the designing comprises finding the optimum value of A for a given spontaneous parametric down-conversion (SPDC) wavelength combination by plotting the equation $\Delta k-2\pi/\Lambda=\Delta k_{QPM}$ for a range of values of A using some material-specific temperature-dependent Sellmeier equations, and then numerically finding the root of the equation where $\Delta k_{QPM}=0$. In one or more examples, the spatially varying dielectric nonlinear susceptibility has one or more periodicities and/or comprises periodic poling.

Block 804 represents selecting dimensions (length L and width W) of the waveguide.

Block 806 represents optionally selecting a chirp $\alpha$ for the spatially varying nonlinear susceptibility. The chirp is the percentage change between the unit cell distance at the beginning and end of the waveguide, and is associated with a bandwidth of the outputted entangled photons. In one or more examples, the step comprises numerically simulating the bandwidth for a range of values of $\alpha$, so as to extract a functional relationship between the bandwidth and $\alpha$. In one or more examples, the step further comprises selecting the chirp producing a bandwidth associated with a temporal correlation of the entangled photons that is shorter than the shortest decoherence time of the matter to be imaged or measured (so that the entangled photons are correlated for a duration of time shorter than the shortest decoherence time). In one or more examples, the chirp is selected as a function of the length of the waveguide.

Block 808 represents fabricating the waveguide comprising the dimensions and nonlinear material having the spatially varying dielectric nonlinear susceptibility (including the chirp) designed according to the steps of Blocks 800-806. In one or more examples, the step comprises a testing step including pumping the waveguide with pump photons so as to form the entangled photons and performing measurements to confirm the entangled photons have the desired temporal correlation for taking part in the optimized multiphoton nonlinear process having the shortest decoherence time. In one or more examples, the steps of Block 800-808 are repeated with modifications if the desired temporal correlation is not achieved.

Block 810 represents the end result, a source of entangled photons. The source can be embodied in many ways including, but not limited to, the following (referring also to FIGS. 1-7).

1. A source of entangled photons 100, comprising:

a waveguide 106 implemented in or comprising a nonlinear material 108 outputting entangled photons 701 in response to continuous wave pump photons irradiating the waveguide; and the nonlinear material comprising a spatially varying dielectric nonlinear susceptibility along the propagation direction 110 of the pump photons in the waveguide (along the length L), with the spatially varying dielectric nonlinear susceptibility $\chi(z)$ phase matching the pump photons and the parametrically down-converted entangled photons, where z is the position along the propagation direction. In one or more examples, the spatially varying dielectric nonlinear susceptibility enables (e.g., optimally efficient) generation of entangled photons taking part in an (e.g., optimized) multiphoton nonlinear process. In one or more further examples, the spatially varying dielectric nonlinear susceptibility $\chi(z)$ phase matches the pump photons and the parametrically down-converted entangled photons so as to customize or tailor an interaction of the entangled photons in a multiphoton nonlinear process and for an application (imaging device application, spectroscopy application, communications system application, computing application) of the multiphoton nonlinear process. In one or more further examples, the spatially varying dielectric nonlinear susceptibility $\chi(z)$ phase matches the pump photons and the parametrically down-converted entangled photons so as to create a temporal correlation of the entangled photons that is shorter than the shortest decoherence time of the material in which the multiphoton nonlinear process is taking place (so that the entangled photons are correlated for a duration of time shorter than the shortest decoherence time of the material).

2. The source of example 1, wherein the spatially varying dielectric nonlinear susceptibility is tailored so that the entangled photons 701 are time-energy entangled, defined as photon pairs which show a strong correlation via the reduced uncertainties associated with the measurements of either their respective frequencies or arrival times, and simulate one or more pulsed photons performing the multiphoton nonlinear process.

3. The source of examples 1 or 2, wherein the spatially varying dielectric nonlinear susceptibility tailors quantum correlations of the entangled photons 701 so they act as pulsed photons in performing the multiphoton nonlinear process.

4. The source of examples 1, 2, or 3, wherein:

the multiphoton nonlinear process comprises absorption or scattering of the entangled photons by a material 703, and the spatially varying dielectric nonlinear susceptibility is tailored so that the entangled photons 701 are absorbed or scattered by the material 703 with an absorption or scattering cross section matching that of one photon linear processes of one or more pulses of light by the material 703.

5. The source of examples 1, 2, 3, or 4 wherein the entangled photons linearize the multiphoton nonlinear process.

6. The source of any of the examples 1-5, wherein:

the nonlinear material comprises a plurality of regions 103, 104 having an arrangement along the propagation direction 110, the spatially varying dielectric nonlinear susceptibility comprises a polarity 112 varying along the propagation direction 110, each of the regions 103 between two adjacent regions 104 along the propagation direction 110 having the polarity 112 that is reversed as compared to, or out of phase with, the polarity 112 in the two adjacent regions 104.

7. The source of any of the examples 1-6, wherein at least one of an arrangement 116, a periodicity 118, a length 120 of each of the regions, or an aspect ratio (width W divided by height H) of the waveguide are tailored to optimize the efficiency of the entangled photons in performing the multiphoton nonlinear process.

8. The source of example 7, wherein the periodicity comprises a plurality of periodicities so that the entangled photons have a wider bandwidth simulating pulsed photons performing the multiphoton nonlinear process.

9. The source of example 7, wherein the length L is in a range of 1 mm to 10 cm.

10. The source of any of the examples 1-9, wherein:

the waveguide 100 comprises a patterned waveguide including the nonlinear material comprising a ferroelectric material or a metamaterial, and each of the regions 103 between the two adjacent regions 104 has the dielectric nonlinear susceptibility $\chi(z)$ comprising an electric polarization P 180 degrees out of phase with the electric polarization P of the two adjacent regions 104.

11. The source of any of the examples 1-10, wherein the waveguide 100 comprises a patterned waveguide comprising the nonlinear material including a periodically poled ferroelectric material.

12. The source of any of the examples 1-11, wherein the spatially varying dielectric nonlinear susceptibility is such that the entangled photons 701 are created in response to a spontaneous parametric down-conversion interaction of a field of the pump photons with the nonlinear material and a vacuum field, each of the pump photons being converted to the entangled photons comprising two or more down converted photons.

13. The source of any of the examples 1-12, wherein the nonlinear material comprises Lithium Niobate or Potassium Titanyl Phosphate (KTP) or Lithium Tantalate.

14. The source of any of the examples 1-13, wherein the waveguide 100 is not in a resonator.

Block 812 represents optionally coupling the source of entangled photons to another device (e.g., a detector 705, another source 100 of entangled photons, or a nonlinear element), so as to form an apparatus.

Block 814 represents an optional end result, an apparatus 700 comprising the waveguide coupled to the detector.

The apparatus of Block 816 can be embodied in many ways including, but not limited to, the following.

15. An apparatus 700, comprising the source of entangled photons of any of the examples 1-14; and a detector 705 detecting a response of a material to the entangled photons, wherein the multiphoton nonlinear process comprises an interaction of the entangled photons with a material.

15. The apparatus 700, wherein the apparatus is an imaging device and the detector 705 forms an image of the material using the entangled photons.

16. The apparatus 700 of example 14 comprising a spectroscopic apparatus performing time resolved spectroscopy of the material 703 using the entangled photons 701.

17. An apparatus, comprising:

a communication or computation system including a plurality of nonlinear elements coupled to the source of entangled photons of any of the examples 1-14 so that the nonlinear elements interact with the entangled photons 701.

19. An apparatus, comprising:

a plurality of the sources 100, 603 of any of the examples 1-14 connected in parallel or series; and couplers 606 combining the entangled photons from each of the sources so as to form outputs of multiple entangled photons, entanglements of the entangled photons, or other combinations of the entangled photons.

20. The source of any of the examples 1-19 coupled to a fiber optic system 502 coupling the pump photons into the waveguide 100.

Method of Operating

Figure 9:
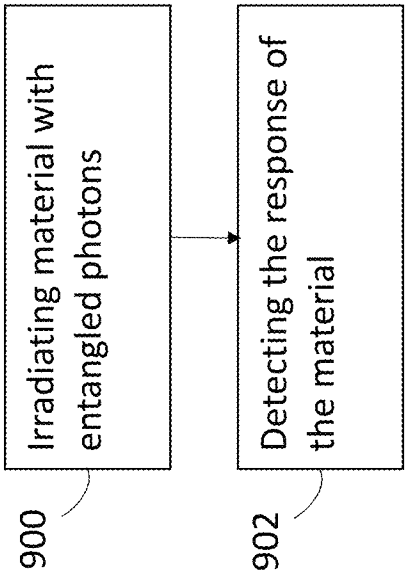
FIG. 9 is a flowchart illustrating a method of operating the source of entangled photons, according to one or more examples.

FIG. 9 illustrates a method of irradiating a material comprising the following steps.

Block 900 represents irradiating the material with entangled photons from a source so as to perform spectroscopy, imaging, communications, or computing using the entangled photons.

Block 902 represents detecting a response of the material to the entangled photons, wherein the source comprises:

a waveguide including a nonlinear material outputting entangled photons in response to continuous wave pump photons irradiating the waveguide; and the nonlinear material comprising a spatially varying dielectric nonlinear susceptibility comprising a polarity varying along a propagation direction of the pump photons in the waveguide, the spatially varying dielectric nonlinear susceptibility phase matching the pump photons and the phase matching tailoring an efficiency of the entangled photons in performing a multiphoton nonlinear process comprising an interaction of the material with the entangled photons; and wherein the interaction comprises scattering of the entangled photons by the material and the entangled photons linearize absorption in the multiphoton nonlinear process.

6. Definitions

The term "continuous wave source" as used herein, generally refers to a source of electromagnetic radiation which could range from ultraviolet to infrared radiation for which the supplied radiation displays coherence in space and time and is continuous in its output intensity.

The term "pulsed laser" refers to a source of electromagnetic radiation which could range from ultraviolet to infrared radiation for which the supplied radiation is coherent in a temporally pulsed wavepacket of multiple photons.

The term "entangled photon" is defined as a photon-based quantum mechanical superposition state of two or more wavefunctions such that the combined wavefunction is not factorable into a product of the two or more individual wavefunctions.

The term "waveguide" is defined as a photonic component fabricated on a nonlinear material capable of generating photon pairs via the process of spontaneous parametric down-conversion, which are entangled with one another displaying quantum correlations in their photonic degrees of freedom. The waveguide utilizes confinement of electromagnetic radiation to enhance the interaction strength of the process and is electrically patterned so as to maximize the efficiency of the parametric down-conversion process at a specific input pump frequency.

Multiphoton nonlinear processes are defined to include spectroscopy and imaging techniques where more than one photon is required for the techniques success but does not include nonlinear laser applications where the high peak laser power of a laser is used to ablate or destroy a material for a resulting effect.

7. References

This specification refers to a number of publications that are incorporated by reference herein.

8. Conclusion

This concludes the description of the preferred embodiment of the present invention. The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A source of entangled photons, comprising a waveguide implemented in a nonlinear material outputting entangled photons, comprising parametrically downconverted entangled photons having a wavelength, in response to continuous wave pump photons irradiating the waveguide; and the nonlinear material comprising a spatially varying dielectric nonlinear susceptibility varying along the propagation direction of the pump photons in the waveguide, with the spatially varying dielectric nonlinear susceptibility chirped for phase matching the pump photons and the parametrically downconverted entangled photons so as to tailor a bandwidth spanned by the downconverted entangled photons that is based at least in part on a property of a material being measured using the entangled photons.

2. The source of claim 1, wherein:

the phase matching outputs the entangled photons with a flux, comprising a number of the entangled photons per second, and the flux is sufficient for spectroscopy of a quantum system and the flux is visible to the eye or measurable on a camera of the type integrated on a mobile phone camera.

3. The source of claim 1, wherein the phase matching outputs the entangled photons with a flux of at least 107 entangled photons per second.

4. The source of claim 2, wherein the spatially varying dielectric nonlinear susceptibility tailors a correlation of the entangled photons for an interaction with the material so that absorption of the entangled photons, in a multiphoton nonlinear process by the material, increases linearly with an intensity of the entangled photons or replicates an femtosecond or longer pulse spectroscopy.

5. The source of claim 1, wherein the spatially varying dielectric nonlinear susceptibility tailors a correlation of the entangled photons so that a response of a sample, comprising the material, to the entangled photons, in a multiphoton nonlinear process, is greater than a classical response of the sample to a classical two-photon nonlinear interaction.

6. The source of claim 5, wherein the response is fluorescence.

7. The source of claim 1, wherein the phase matching is such that the spectral power distribution of the entangled photons comprises 0.1-2.5 nW/nm for wavelengths of the entangled photons in a range of 600 nm-1000 nm.

8. The source of claim 1, wherein a chirp of the spatially varying dielectric nonlinear susceptibility is defined by adjacent regions comprising a first region and a second region of the waveguide, each of the adjacent regions comprising a unit cell having different orientation of a nonlinear susceptibility, and a distance between center C1 of the first region and the center C2 of the second region is changed between a beginning and an end of the waveguide to form the output of the entangled photons.

9. A spectrometer or imaging device comprising the source of claim 1.

10. A source of entangled photons, comprising a waveguide implemented in a nonlinear material outputting entangled photons, comprising parametrically downconverted entangled photons, in response to continuous wave pump photons irradiating the waveguide; and the nonlinear material comprising a spatially varying dielectric nonlinear susceptibility varying along the propagation direction of the pump photons in the waveguide, with the spatially varying dielectric nonlinear susceptibility chirped for phase matching the pump photons and the parametrically downconverted entangled photons so that the entangled photons are correlated for a duration of time shorter than a shortest decoherence time of a material being measured using the entangled photons.

11. The source of claim 10, wherein the spatially varying nonlinear susceptibility is tuned to create temporal correlations of the entangled photons that are matched to a timescale of a two-photon light absorption or fluorescence process in the material.

12. The source of claim 10, wherein the spatially varying nonlinear susceptibility tailors a correlation of the entangled photons having a wavelength, so as to increase matching of an absorption or scattering cross-section, of the material for the entangled photons in a multiphoton nonlinear process, with an absorption or scattering cross section of the material for a single photon having the wavelength.

13. A spectroscopic apparatus comprising the source of claim 10, wherein the apparatus compares an interaction of the entangled photons by the material to that produced by a single photon.

14. The spectroscopic apparatus of claim 13, wherein the spectroscopic apparatus uses time and spectral resolved spectroscopy to compare the entangled versus classical interactions.

15. A spectroscopic apparatus comprising the source of claim 11, further comprising: an interferometer for manipulating the entangled photons before interacting with the material; and a detector detecting a response of the material, such that a CW laser is used for femtosecond or longer spectroscopy.

16. The source of claim 10, wherein a chirp of the spatially varying nonlinear susceptibility is defined by adjacent regions comprising a first region and a second region of the waveguide, each of the adjacent regions comprising a unit cell having different orientation of a nonlinear susceptibility, and a distance between center C1 of the first region and the center C2 of the second region is changed between a beginning and an end of the waveguide to form the output of the entangled photons.

17. The source of claim 16, wherein:

the waveguide comprises a patterned waveguide including a periodically poled ferroelectric material or a metamaterial, and each of the regions between the two adjacent regions has the dielectric nonlinear susceptibility comprising an electric polarization 180 degrees out of phase with the electric polarization of the two adjacent regions.

18. The source of claim 17, wherein the entangled photons are created in response to a spontaneous parametric down-conversion interaction of a field of the pump photons with the nonlinear material and a vacuum field, each of the pump photons being converted to the entangled photons comprising two or more down converted photons.

19. The source of claim 16, wherein the nonlinear material comprises Lithium Niobate or Potassium Titanyl Phosphate (KTP) or Lithium Tantalate.

20. The source of claim 10, wherein the spatially varying dielectric nonlinear susceptibility tailors correlations and bandwidth of the entangled photons so that the entangled photons simulate a pulsed photon in performing a single or multiphoton interaction with the material.

21. The source of claim 1, wherein the property is a molecular lifetime of the material.

22. A chip comprising the source of claim 1, wherein the waveguide and the chip output a single mode spatial distribution of photonic states of the entangled photons.

23. A chip comprising the source of claim 10, wherein the waveguide and the chip output a single mode spatial distribution of photonic states of the entangled photons.

* * * * *